US010803128B2

(12) United States Patent
Boyd et al.

(10) Patent No.: US 10,803,128 B2
(45) Date of Patent: Oct. 13, 2020

(54) LINEAL DATA STORAGE AND RETRIEVAL SYSTEM

(71) Applicant: THE BOEING COMPANY, Chicago, IL (US)

(72) Inventors: Mark H. Boyd, Redondo Beach, CA (US); Jeffery M. Bearce, Covington, WA (US); Richard A. Eith, Renton, WA (US); Leah T. Chatkeonopadol, Pasadena, CA (US)

(73) Assignee: THE BOEING COMPANY, Chicago, IL (US)

( * ) Notice: Subject to any disclaimer, the term of this patent is extended or adjusted under 35 U.S.C. 154(b) by 232 days.

(21) Appl. No.: 15/843,547

(22) Filed: Dec. 15, 2017

(65) Prior Publication Data

US 2019/0188335 A1      Jun. 20, 2019

(51) Int. Cl.
| | | |
|---|---|---|
| *G06F 16/907* | (2019.01) | |
| *G06F 16/2453* | (2019.01) | |
| *G06F 16/2457* | (2019.01) | |
| *G06F 16/903* | (2019.01) | |

(52) U.S. Cl.
CPC ........ *G06F 16/907* (2019.01); *G06F 16/2453* (2019.01); *G06F 16/24573* (2019.01); *G06F 16/90335* (2019.01)

(58) Field of Classification Search
None
See application file for complete search history.

(56) References Cited

U.S. PATENT DOCUMENTS

| | | | | |
|---|---|---|---|---|
| 6,977,608 B1 * | 12/2005 | Anderson | ............... | G01C 21/16 340/945 |
| 7,633,428 B1 * | 12/2009 | McCusker | .............. | G01S 7/003 342/26 B |
| 7,734,601 B2 * | 6/2010 | Weber | ..................... | G06F 16/44 707/695 |
| 8,819,010 B2 * | 8/2014 | Fankhauser | ............ | G06Q 10/10 707/736 |
| 2005/0024236 A1 * | 2/2005 | Gosdin | .................. | H04H 60/71 340/905 |

(Continued)

*Primary Examiner* — Uyen T Le
(74) *Attorney, Agent, or Firm* — MH2 Technology Law Group LLP

(57) ABSTRACT

System, methods, and computer program products providing an information asset management system including an information asset registry that stores metadata of information assets and having a logical structure that lineally links information assets. The logical structure includes data structures having a logical element comprising an identifier identifying an information asset, logical elements including metadata of the information asset, and logical elements including lineage information that relates the information asset to other information assets. The program instructions cause the information asset management to perform operations including receiving a query for information describing a first information asset. The operations also include determining lineal links between the first information asset and other information assets. The operations further include retrieving the metadata of the first in formation asset and the information assets. The operations further include providing a result based on the metadata of on the first information asset and the other information asset.

20 Claims, 7 Drawing Sheets

(56) References Cited

U.S. PATENT DOCUMENTS

| | | | |
|---|---|---|---|
| 2010/0161575 A1* | 6/2010 | Basso | G06F 16/219 |
| | | | 707/705 |
| 2012/0005205 A1* | 1/2012 | Bobick | G06F 8/60 |
| | | | 707/736 |
| 2013/0132383 A1* | 5/2013 | Ahlberg | G06F 16/334 |
| | | | 707/736 |
| 2013/0332423 A1* | 12/2013 | Puri | G06F 16/219 |
| | | | 707/687 |
| 2014/0149416 A1* | 5/2014 | Wallace | G06F 16/285 |
| | | | 707/737 |
| 2014/0195532 A1* | 7/2014 | Dheap | G06F 16/901 |
| | | | 707/736 |
| 2017/0126702 A1* | 5/2017 | Krishnamurthy | H04L 63/123 |
| 2018/0089291 A1* | 3/2018 | Vankamamidi | G06Q 10/0637 |
| 2018/0240273 A1* | 8/2018 | Gordon | G06F 16/215 |
| 2018/0314724 A1* | 11/2018 | Anderson | G06F 16/2365 |

\* cited by examiner

| INFO ASSET DESCRIPTOR 500 | | |
|---|---|---|
| IDENTIFIER 503 | WEATHER INFO (409) | ⎬ 501A |
| NAME 505 | WEATHER_IMAGE_EC_5M | ⎬ 501B |
| DESCRIPTION 509 | 5M WEATHER IMAGERY, EC | ⎬ 501C |
| SOURCE/LOCATION 513 | SOURCE (103) | ⎬ 501D |
| CONTENT CLASS 517 | WEATHER | ⎬ 501E |
| CONTENT TYPE 521 | IMAGERY | ⎬ 501F |
| CREATION DATE 525 | YYYY-MM-DDThh:mm:ss.sTZD | ⎬ 501G |
| REVISION DATE 529 | YYYY-MM-DDThh:mm:ss.sTZD | ⎬ 501H |
| EXPIRATION DATE 531 | YYYY-MM-DDThh:mm:ss.sTZD | ⎬ 501I |
| LINEAGE 533 | YES | ⎬ 501J |
| - PARENT 1 | WEATHER SERVICE (417) | ⎬ 501K |
| - PARENT 2 | | ⎬ 501L |
| ... | | ⎬ 501M |
| - PARENT N | | ⎬ 501N |
| - CHILD 1 | TRIP BRIEF (401) | ⎬ 501O |
| - CHILD 2 | | ⎬ 501P |
| ... | | ⎬ 501Q |
| - CHILD N | | ⎬ 501R |
| USAGE LIMITATIONS 555 | NON-FOREIGN | ⎬ 501S |
| ACCURACY 559 | 5 METER | ⎬ 501T |
| TIMELINESS 561 | 24 HOUR | ⎬ 501U |
| QUALITY 563 | HIGH | ⎬ 501V |

FIG. 5

LINEAL DATA STORAGE AND RETRIEVAL SYSTEM

FIELD

The present invention relates generally to storing, retrieving, and managing various kinds of data, and more particularly, to an improved database architecture and method for using the same.

BACKGROUND

Hardware products are often reused or combined with other products. For example, a video display produced by one vendor may be incorporated into a touch screen device of another vendor. In turn, the video display module may be incorporated into a computing system (e.g., a navigation unit) to provide a computer-user interface device for a product of another vendor.

A similar situation exists for software products (e.g., program axle and/or data). For example, a software vendor can create geospatial information for a mapping service. The geospatial information can be combined with other information in a navigation application provided by another vendor. In turn, the combined geospatial information can be integrated with other information (e.g., services, traffic, weather, radar, and/or threat information) as part of an augmented reality application provided by another vendor. However, unlike hardware products, there are essentially no physical limitations on the reuse of software. Rather, software can be copied, modified, and reused almost endlessly.

To manage the reuse of software products after their creation, the software products may be associated with various limitations on their transfer and use. Doing so can be important from both an ownership perspective and a quality perspective. For example, an originator of a software product may provide it to others with information indicating that its reuse or transfer requires approval by the originator. Additionally, the software product may be provided with information limiting the circumstances under which it should be used. For example, geospatial information may have a limited resolution or accuracy that makes it unsuitable for certain applications outside of its original purpose. Further, weather information may only be useful for a limited time after its creation due to a change in conditions and/or the availability of newer information.

At some point in time after a software product is created, the limitations established by its originator may be lost, forgotten, or ignored. The resulting loss of control can lead to many issues. For example, an entity that reuses the software product may only become a ware that it lacks authorization to reuse the original asset after investing a significant amount of time and money into integrating the software product into its own product. Additionally, in the event the provider of the original software vendor makes a critical update, it may be impossible to identify other applications that has reused or incorporated the original software product.

SUMMARY

The present application discloses systems, methods, and computer program products for enhancing security and accuracy of information assets. In implementations, an information asset management system includes a processor, a computer-readable memory device storing program instructions, and an information asset registry. The information asset registry storing metadata of information assets and having a logical structure that lineally links two or more of the information assets. The logical structure includes data structures having a logical element comprising an identifier identifying an information asset, logical elements including metadata of the information asset, and logical elements including lineage information that relates the information asset to the other information asset. The program instructions cause the information asset management to perform operations including receiving a query for information describing a first information asset of the plurality of information assets. The operations also include determining lineal links in the information asset registry between the first information asset and the other information asset. The operations further include retrieving the metadata of the first information asset and the other information asset. The operations further include providing a result based on the metadata of on the first information asset and the other information asset. In some implementations, the lineal links associate the first information asset and the other information asset. In some implementations, providing the result includes combining metadata of the first information asset with the metadata of the other information asset. In some implementations the operations include limiting use of the first information asset based on the result, in some implementations, the limiting includes determining that the use of the first information asset violates a predefined usage limitation included in the first information asset and the other information asset of the plurality of information assets. In some implementations the limiting includes determining that the use of the information asset violates a predefined limitation on transferring the first information asset based the predefined limitation included in the first information asset and the other information asset of the plurality of information assets. In some implementations, the limiting includes determining that accuracy information included in the first information asset and the other information asset of the plurality of information assets is below a predetermined requirement of the first information asset. In some implementations, the limiting includes determining that quality information included in the first information asset and the other information asset of the plurality of information assets is below a predetermined requirement of the first information asset. In some implementations, the limiting includes determining that timeliness information included in the first information asset and the other information asset is below a predetermined threshold of the first information asset. In some implementations, the operations also include receiving requirements from a user device and comparing the one or more requirements to the metadata of on the first information asset and the other information asset.

Additionally, implementations disclosed herein provide a system for enhancing security and accuracy of information assets. The system includes a processor, a computer-readable memory device operatively coupled to the processor and storing program instructions, and a computer-readable data storage device operatively couple to the processor. The system also includes an information asset registry lineally linking a plurality of information assets in a logical data structure. The program instructions, when executed by the processor, cause the system to perform operations including receiving a query for a first information asset. The operations also include determining a lineal link between the first information asset and a second information asset using the information asset registry. The operations further include determining, based on the lineal link, an attribute of the first information asset and an attribute of the second information asset. The operations further include providing a result to the query based on the attribute of on the first information asset and the attribute of the second information asset, the result limiting use of the first information asset. In some implementations, the lineal link represents a direct lineal relationship between the first information asset and the second information asset. In some implementations, providing the result includes combining the attribute of the first information asset with the attribute of the second information asset. In some implementations, limiting the use of the first information asset includes restricting execution, transfer, and duplication of the first information asset. In some implementations, limiting the use of the first information asset includes determining that the use of the first information asset violates a predefined usage limitation included in the attribute of the first information asset or a predefined usage limitations included in the attribute of the second information asset. In some implementations, limiting the use of the first information asset includes determining that the use of the information asset violates a predefined limitation an transferring the first information asset based on the attribute of the first information asset and on the attribute of the second information asset. In some implementations, the attribute of the first information asset and the attribute of the second information asset include accuracy information. In some implementations, the attribute of the first information asset and the attribute of the second information asset quality information. In some implementations, the attribute of the first information asset and the attribute of the second information asset include timeliness information. In some implementations, the operations further include receiving requirements from a user device, and comparing the one or more requirements to the attribute of on the first information asset and the attribute of the second information asset.

DRAWINGS

The present disclosure will become more fully understood from the detailed description and the accompanying drawings, wherein:

FIG. 5 shows table illustrating an example of a data structure, in accordance with aspects of the present disclosure.

DETAILED DESCRIPTION

Figure 1:
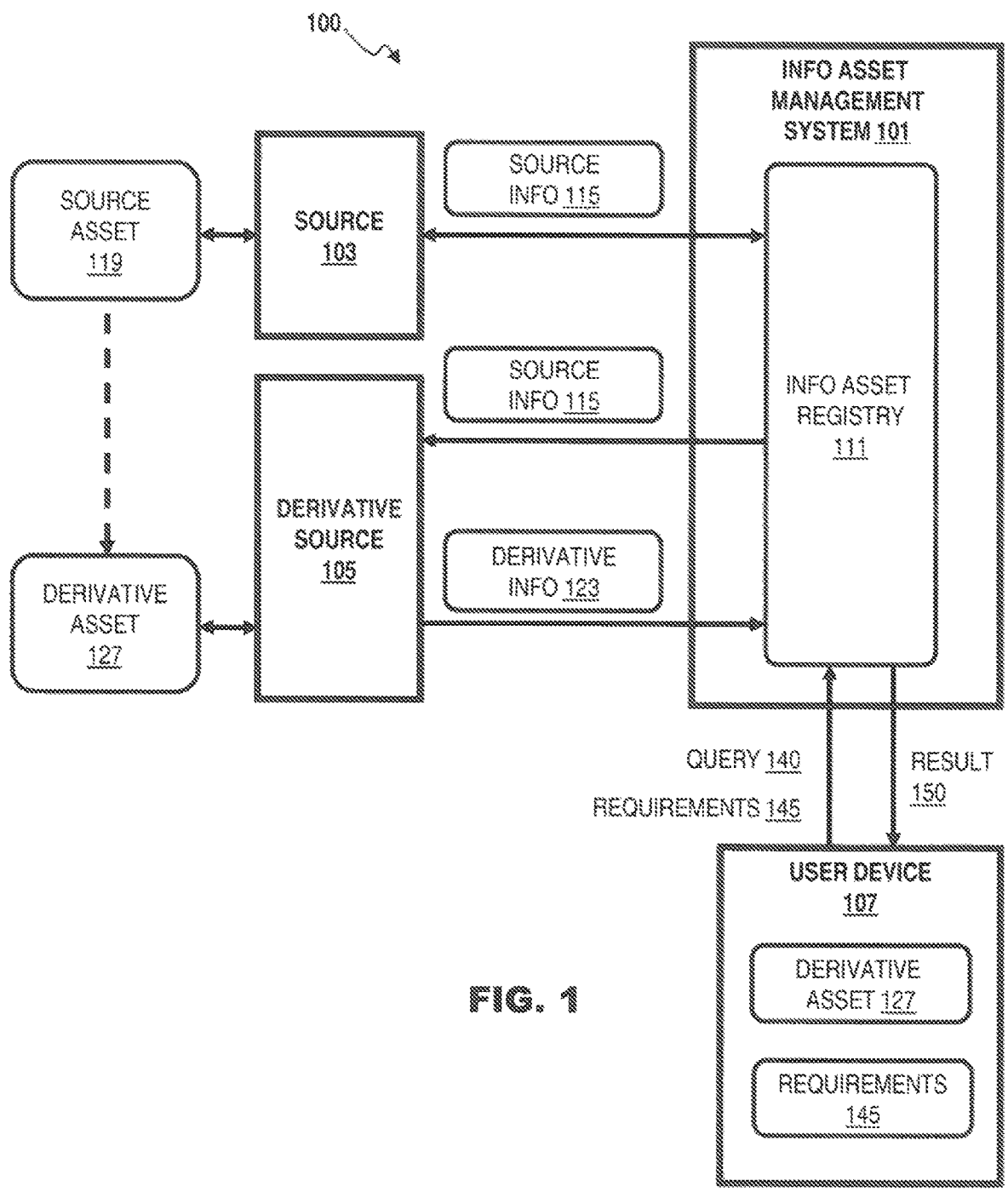
FIG. 1 shows a system block diagram illustrating an example of an environment for implementing systems and processes, in accordance with aspects of the present disclosure.

Systems and methods for managing information assets are disclosed. Implementations consistent with the present disclosure provide an information asset management system that includes a specialized registry that establishes lineal links between information assets. In accordance with aspects of the present disclosure, a lineal link is metadata representing a direct lineal relationship between a first information asset (e.g., a source information asset) and a second information asset derived from the first information asset (e.g., a derivative information asset). The second information asset may lineally related to the first information asset because it includes some or all of the first information asset. Such lineal links enhance the security and the accuracy of the information assets by controlling the use of the second derivative information asset based on the first information asset from it was derived.

In some implementations, the registry comprises data structures including metadata representing attributes of the respective information, assets (e.g., identification, accuracy, timeliness, and/or quality) and information representing respective lineal links of the respective information assets. For example, a first entity may provide a first information asset, such as weather imagery that is updated hourly. A second entity may provide a second information asset, such as geospatial location data, which is updated semi-annually. A third entity may combine the weather imagery and the geospatial location data in a third data asset, which is a software aircraft flight planning system. The first entity may have little or no regard for how fresh or timely of the weather imagery. However, because weather may substantially change in a short time (e.g., minutes or hours) knowing the freshness or timeliness of the first information asset may be important to the users of the flight planning system because it informs them of the bounds they may have when establishing plans or routes. For reasons, it may be important to the users of the flight planning system to be aware of changes in the accuracy of the geospatial information provided by the second information asset. In accordance with aspects of the present disclosure, the flight planning system can query the information asset registry and determine the timeliness (e.g., freshness) and/or accuracy of any of the information assets that have a lineal relationship with the flight planning system. Based on the query result, the flight planning system can provide notices and/or warnings with regard to the timeliness or the accuracy of the individual information assets and/or the combination information assets. Also, use of the first and/or second information assets can be limited or denied when the quality or the information is below that required for a particular derivative information asset.

Additionally, the registry can be used to manage the use of information assets. For example, the first entity can register the first information asset with the registry along with limitations on its use and/or reuse. The limitations can include restricting or forbidding execution, transfer, and duplication an information asset. Additionally, the limitations can include, for example restrictions on what entities, individuals, roles, and/or groups, may use an information asset. Subsequently, the first information asset can be reused by combining it with other information assets to form a derivative information asset. For example, when a system attempts to perform an operation on the derivative information asset (e.g., executing or copying), the system can query the registry and determine the limitations associated with the derivative information asset by its lineal relationships. Based on the query result, the system can provide alerts to users indicating the limitations on the use of the first information assets, the derivative information asset, or any of the information assets in the lineage. Also based on the query, the system can limit and/or the prevent operations using the derivative information asset.

As described above and detailed below, implementations consistent with the present disclosure, provide an innovative logical model for a computer registry having a specific type of data structure that stores information describing information assets and information representing lineal links between such information assets. The registry improves the way computers store and retrieve information that controls how related information assets are used in applications. In accordance with implementations of the present disclosure, the registry stores information in lineal chains that identify sources, timeliness, accuracy, and/or usage limitations on the information assets. By doing so, implementations consistent with the present disclosure address various technical problems. For example, implementations store attribute information in an efficient manner that allows entire lineages to be retrieved from the registry based on a single information asset in the chain. Implementations also improve the accuracy of computing systems that execute the information assets by preventing and/or providing notifications that the source information asset, when evaluated against user-configurable criteria, is inaccurate and/or stale for use by another information asset in the chain. Implementations can also improve security of information assets by preventing unauthorized execution based on other information assets in the chain. Based on such information, the registry can provide information, such as: who may/may not use the information asset; whether the information asset be copies or transferred; worst-case accuracy of the information asset: best-case accuracy of the information asset; resolution of the information asset; and freshness of data in the information asset. Thus, implementations disclosed herein can provide definitive usage limitations throughout the lineage of an information asset. That is, knowing where the data has been stored, transferred, combined, or distilled into derivative products allows the original usage limitations to be viewed and reported. Additionally, it allows use or transfer of the information asset to be limited or denied.

Reference will now be made in detail to specific implementations illustrated in the accompanying drawings and figures. In the following detailed description, numerous specific details are set forth to provide a thorough understanding of the disclosed implementations. However, it will be apparent to one of ordinary skill in the art that implementations may be practiced without these specific details. In other instances, well-known methods, procedures, components, circuits, and networks have not been described in detail so as not to unnecessarily obscure aspects of the implementations.

FIG. 1 shows a block diagram illustrating an example of an environment 100 for implementing systems and processes in accordance with aspects of the present disclosure. The environment 100 includes an information management system 101, a source 103, a derivative source 105, and a user device 107. The information management system 101 can include one or more computing devices that provide and interact with an information asset registry 111 that stores source information 115 corresponding to at least one source asset 119 and derivative information 123 corresponding to at least one derivative asset 127.

The source 103 can be an entity that generates and/or provides the source asset 119. The source 103 can be an individual, a business, or an organization that creates modifies, maintains, and/or stores data and computer program code. For example, the source 103 can be a data provider that generates weather imagery or geospalial location data used for aircraft navigation. The source asset 119 can be original data and/or computer program code (e.g., substantially new), or derivative data and/or computer program code (e.g., entirely or partially reused). The source information 115 can be a data structure including information describing the source asset 119 (e.g., metadata). As described in greater detail below, the source information 115 in accordance with aspects of the present disclosure can include information describing the lineage of the source asset 119 the type and/or classification of the source asset 119, quality, or accuracy of the source asset 119, and/or usage limitations on the source asset 119.

The derivative source 105 can be any entity that generates and/or provides the derivative asset 127 by modifying an existing information asset, such as the source asset 119. For example, the derivative source 103 can be a software developer and the derivative asset 127 can be flight management software that uses geospatial data (e.g., source asset 119) generated by the source 103. Modifying the source asset 119 can include changing the data or code of the source asset 119 and/or combining (e.g., associating, appending, or merging) the data or code of the source asset 119 with other data or code. The derivative asset 127 can be derivative data and/or derivative computer program code resulting from such modification or combination. The derivative information 123 can be a data structure including information describing the derivative asset 127 (e.g., metadata), which may be the same or similar to the source information 115. The derivative information 123 can also include information describing lineal lings between the derivative asset 127 and other information assets, such as source asset 119.

The user device 107 can be a computing system that is communicatively connected (directly or indirectly) to the information asset management system 101 via one or more communication channels (e.g., a serial data link, a parallel data link, a wireless data link, a local area network, a wide area network, and/or the Internet). In various to implementations, the user device 107 can be a personal computer system, a handheld or laptop device, a set top box or other programmable user electronics that provides an interlace, such as a graphic user interface, with which a user can interact with the information asset management system 101 to provide and/or receive in stored in the information asset registry 111. The user device 107 can provide a query 140 the information management system 101 to obtain information about the derivative assets 127 or an instantiation thereof. The query 140 can be generated by a user (not shown) of the user device 107, or automatically generated by the user device 107 (e.g., when an operation is performed on the derivative asset 127). Additionally, in implementations, the user device 107 can provide requirements 145 to the information asset management system 101. The requirements 145 can be, for example, information defining threshold requirements for quality freshness, timeliness, and accuracy, quality, and/or usage credentials.

In response to the query 140, the information asset management system 101 can retrieve information from the registry and return a result 150 to the user device. In accordance with aspects of the present disclosure the result 150 can include quality, timeliness, accuracy, and/or usage restriction information based on information assets (e.g., source asset 119) in the lineage of the derivative asset 127. The user device 107 can compare the information in the result 150 with predefined requirements 145 for the use of the derivative asset 127 by the user device 107. Based on such comparison, the user device 107 can provide notifications and/or prevent further execution of the information asset. In implementations, such comparison is performed by the information asset management system 101 based on the requirements 145.

Figure 2:
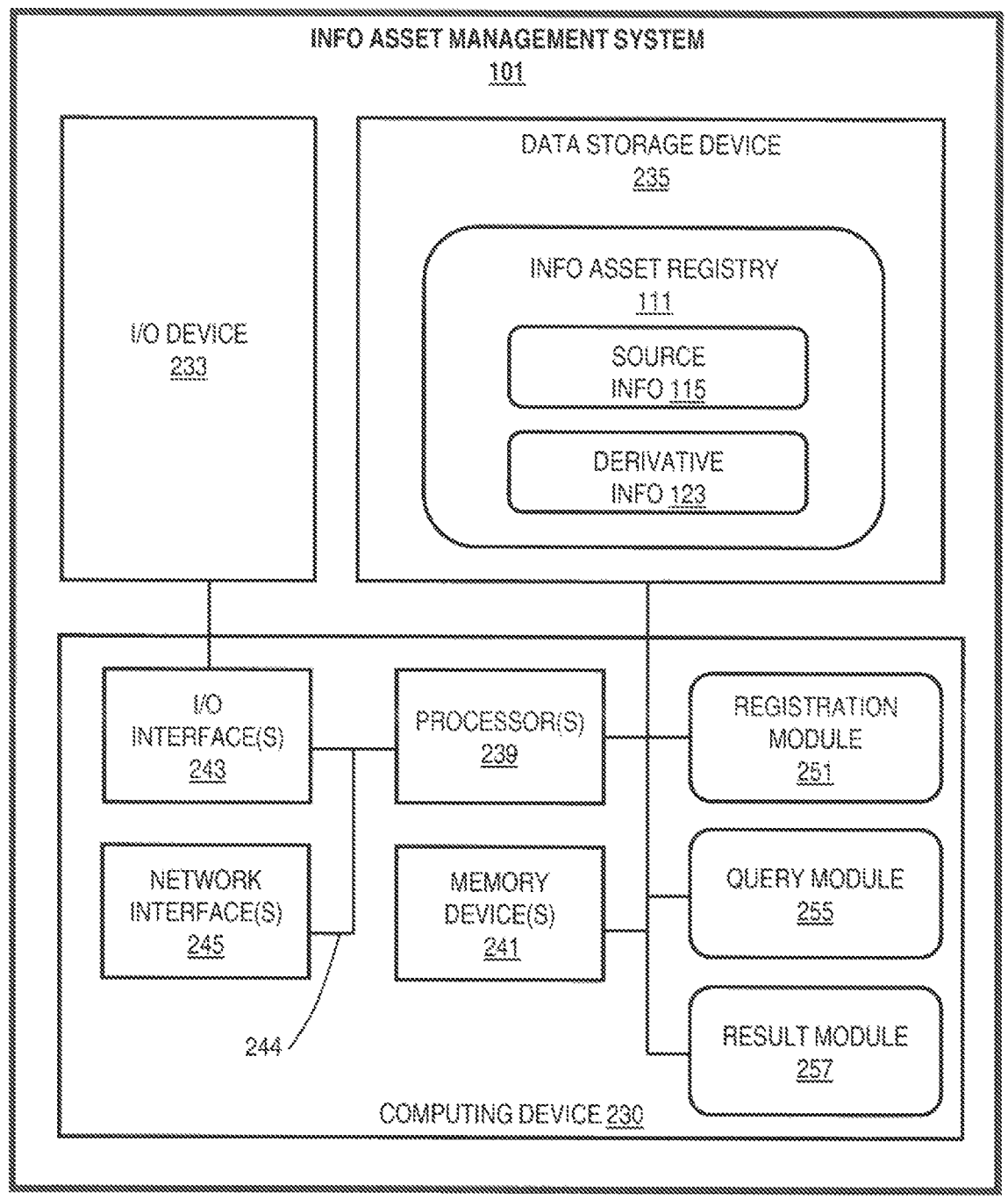
FIG. 2 shows a block diagram illustrating an example of a system, in accordance with aspects of the present disclosure.

FIG. 2 shows a system block diagram illustrating an example of an information asset management system 101, in accordance with aspects of the present disclosure. The information asset management system 101 includes hardware and software that perform the processes and functions disclosed herein. In implementations, the information asset management system 101 includes a computing device 230, an input/output (I/O) device 233, and a storage system 235. The I/O device 233 can include any device that enables an individual to interact with the computing device 230 (e.g., a user interface) and/or any design that enables the computing device 230 to communicate with one or more other computing, devices using any type of communications link. The I/O device 233 can be, for example, a touchscreen display, pointer device, keyboard, etc.

The storage system 235 can comprise a computer-readable, non-volatile hardware storage device operatively connected to the processor 239 that stores information and program instructions. For example, the storage system 235 can be one or more flash drives and/or hard disk drives. In accordance with aspects of the present disclosure, the storage device 235 stores an information asset registry 111, including source information and derivative information 123, which can all be the same or similar to those described previously herein. While the information asset registry 111 is illustrated as including only source information 115 and derivative information 123, it is understood that the registry can store a large number of such information elements, some of which may be linked as lineal chains, as described herein.

In embodiments, the computing device 230 includes one or more processors 239 (e.g., microprocessor, microchip, or application-specific integrated circuit), one or more computer-readable memory devices 241 (e.g., random-access memory (RAM) and read-only memory (ROM)), one or more I/O interfaces 243, and one or more network interfaces 245 operatively connected to the processor 239. The memory device 241 can include a local memory (e.g., a random-access memory and a cache memory) employed during execution of program instructions. Additionally, the computing device 230 includes at least one communication channel 244 (e.g., a data bus) by which it communicates with the I/O device 243 and the storage system 235. The processor 239 executes computer program instructions (e.g., an operating system and/or application programs), which can be stored in the memory device 241 and/or storage system 235.

The processor 239 can also execute computer program instructions of a registration module 251, a query module 255, and a result module 257. The registration module 251 can be data and/or computer program code that, when executed by the processor 239, controls the computing device 230 to interface with entities (e.g., source 119 and derivative 127) using the I/O interlaces 243 and/or the network interfaces 245 to obtain information asset metadata (e.g., source information 115 and derivative information 123), convert (e.g., normalize and/or genericize) the metadata, and store such information in the information asset registry 111 in association with related information assets. For example, the registration module 251 can use the I/O devices 233 and/or the network interfaces 245 to provide a computer-user interface that interactively obtains information asset information from entities in a registration process. The query module 255 can be data and/or computer program code that, when executed by the processor 239, control the computing device 230 to interlace with users (e.g., a user of user device 107) and/or software applications to receive, process, and respond to queries of the information asset registry 111.

The result module 257 can be data and/or computer program code that, when executed by the processor, controls the computing device 230 to process an output of the query module 255 of the query to the information asset registry 111 and return such as a result (e.g., result 150) to the user device. In accordance with aspects of the disclosure, a result for information asset information includes metadata of that information asset stored in the registry 111, and also include metadata for any other information assets in the lineage of the information asset. In some implementations, the result module 257 can also compare the result to of the query to requirements requirements 145) received from the user device, and return an output of such comparison as a result (e.g., result 150) to the user device. Thus, based on processing by the result module 257, the information asset management system 101 can provide information indicating whether the user or the user device is authorized to use the information asset. In accordance with aspects of the present disclosure, such authorization can be based on any of the metadata of the information assets in the associated lineage the queried information asset. In some implementations, the authorization can based on usage or distribution limitations indicated by the metadata in the lineage of the queried information asset. For example, one or more of the information asset information in the lineage may limit the use of the corresponding information asset to certain entities (e.g., users or groups) and/or forbid use of the information asset by certain entities. Accordingly, a change in the usage or distribution limitations by a source of a senior information asset in the chain can control the use of derivative information assets regardless of the source's awareness of such derivative information assets. In some implementations, the authorization can be based on time limitations or quality of data of the indicated by the metadata in the lineage of the queried information asset.

The computing device 230 can comprise any general-purpose computing article of manufacture capable of executing computer program instructions installed thereon (e.g., a personal computer, server, etc.). However, the computing device 230 is only representative of various possible equivalent-computing devices that can perform the processes described herein. To this extent, in embodiments, the functionality provided by the computing device 230 can be any combination of general and/or specific purpose hardware and/or computer program instructions. In each embodiment, the program instructions and hardware can be created using standard programming and engineering techniques, respectively.

Figure 3:
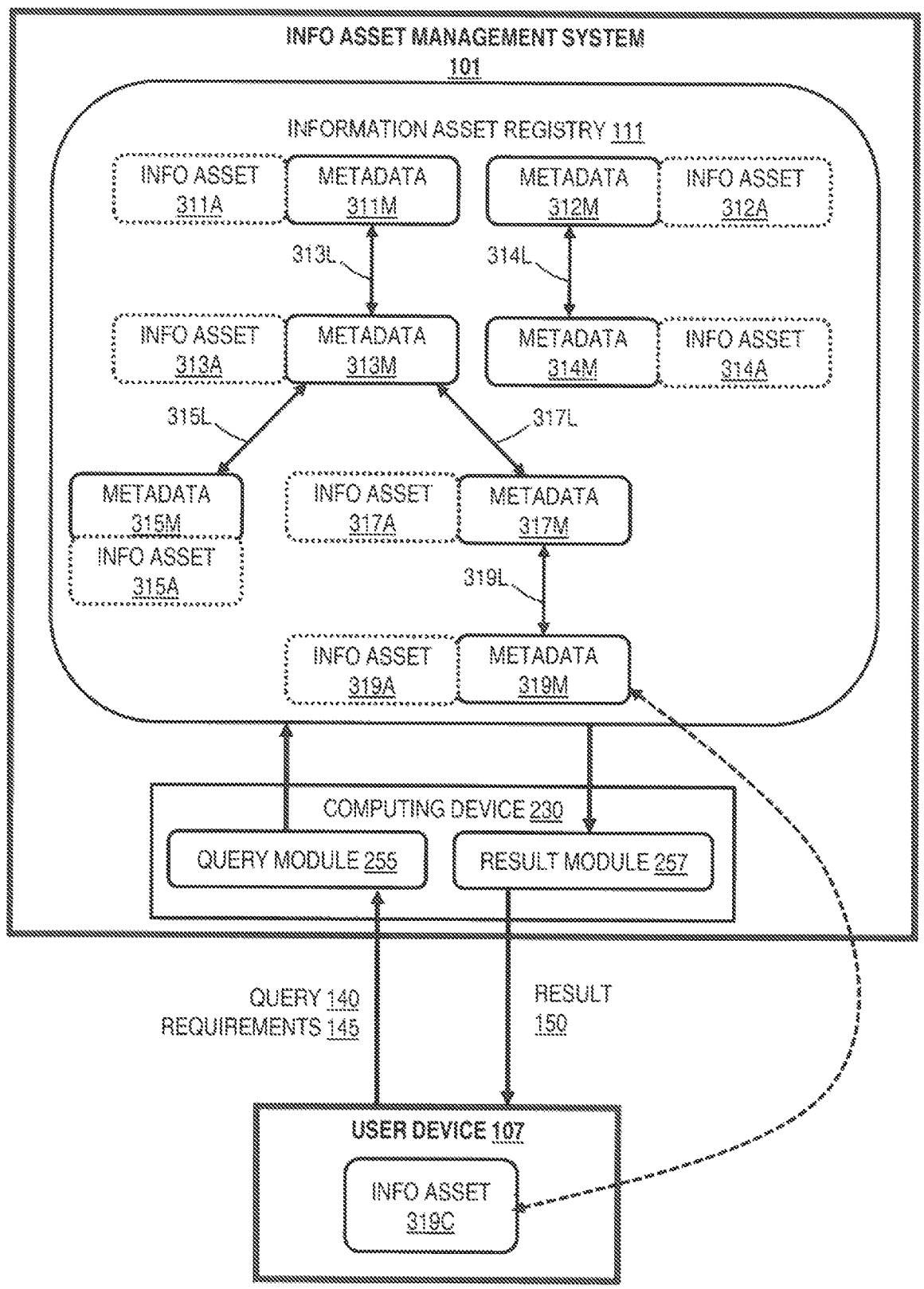
FIG. 3 shows a functional block diagram illustrating an example of a system, in accordance with aspects of the present disclosure.

FIG. 3 shows a functional block diagram illustrating an example of an information asset management system 101 interacting with a user device 107 in accordance with aspects of the present disclosure. The registry 111 has logical structure that lineally links information assets by storing mutually-referential data structures (metadata). The registry 111 is designed to improve the way the information asset management system 101 stores, retrieves, and manages data in the registry 111 by establishing associations linking one or many derivative assets in lineal chains. By doing so, the information asset management system 101 can quickly and accurately identify information assets in the same lineage when responding to a query 140 regarding a particular information asset.

In the example illustrated in FIG. 3, the registry 111 may store data structures comprising metadata 311M, 312M, 313M, 314M, 315M, 317M, and 319M corresponding, respectively, to information assets 311A, 312A, 313A, 314A, 315A, 317A, and 319A. The metadata 311M, 313M, 317M, and 319A can include information, such as description information, accuracy information, quality information, and usage limitations. The dashed boxes of the information assets 311A, 312A, 313A, 314A, 315A, 317A, and 319A illustrated in FIG. 3 indicate that they may not be stored in the registry 111. Rather, the information assets 311A, 312A, 313A, 314A, 315A, 317A, and 319A may be stored remotely and the registry 111 may store pointers to their locations. The pointers can be stored, for example, in the metadata 311M, 312M, 313M, 314M, 315M, 317M, and 319M. Further, the registry 111 can store lineage information 313L, 314L, 315L, 317L, and 319L representing lineal relationships between 311A, 312A, 313A, 314A, 315A, 317A, and 319A and/or metadata 311M, 312M, 313M, 314M, 315M, 317M, and 319M. These links are stored in data structures that manage all links between information assets, with the types of relationship such as 'child-parent' specifically identified. The data structures holding the link information are updated whenever the state of the information asset information is updated. For example, as indicated by lineage information 313L, 315L, 317L, and 319L, the information asset 319 (and the instantiation of the information asset 319) has a lineal relationship with 311A, 313A, 315A, and 317A and/or metadata 311M, 313M, 315M, and 317M.

In accordance with aspects of the present disclosure, the user device 107 may possess the information asset 319C, which is an instantiation or a copy of the information asset 319A that has been obtained by the user (not shown) of the user device 107 (e.g., a third-party provider). As a prerequisite for using, modifying copying and/or transferring the information asset 319A, the user device 107 may provide a query 140 to the information asset registry 111 maintained by the information asset management system 101. For example, the user device 107 may attempt to retrieve, call, instantiate, store, copy, modify, under execute the information asset 319C. Prior to completing such operations, the user device 107 can automatically generate and provide the query 140 to the information asset management system 101.

The information asset query 140 can contain information describing the instantiation of an information asset 319A, including an identifier of the instantiation of an information asset 319A. The query 140 can include other information, including usage credentials, such as an identifier of the user and/or the user device 107. Additionally, in implementations, requirements 145 provided with the query 140 can include accuracy requirements (e.g., required resolution of image data), quality requirements (e.g., a required freshness of the data), and/or timeliness requirements creation date, expiration date, and/or revision date).

The query 140 can be received by query module 255 executed by computing device 230 of the information asset management system 101. The query module 255 can process the information asset query 140 to request metadata 319M related to the instantiation of an information asset 319A from the information asset registry 111, as well as any metadata in the lineage of the information asset 319A (e.g., links 313L, 317L, and 319L, which represent lineal relationships between information assets 311A, 313A, 317A, and 319A).

Using the information the query 140, the registry 111 can determine the lineage of the information asset 319C by iteratively and progressively determine the lineage information 319L linking metadata 319M to metadata 317M, the lineage information 317L linking metadata 317M to metadata 313M, and the lineage information 317L linking metadata 317M to metadata 313M. For each link in the lineal chain identified based on the query 140, the query module 255 can determine the associated metadata 311M, 313M, 317M, and 319M. The result module 257 can retrieve the metadata 311M, 313M, 317M, and 319M identified by the query module 255, process (e.g., transform) such information to determine a result 150, and provide the result 150 to the user device 107. The query result 150 can include one or more types of information in accordance with implementations of the present disclosure. In some implementations, the result 150 can include information indicating that the data's accuracy is beyond the established criteria appropriate for a specific usage of the data. In some implementations, the result 150 can include information authorizing or forbidding, use of the instantiation of an information asset 319A. For example, the query result 150 can indicate use of the instantiation of the information asset 319A by the user device 107 or a user of the user device 107 in not authorized based on information contained in one or more of the metadata 311M, 313M, 315M, and 317M lineally related to the instantiation of the information asset 319A. In some implementations, the query result 150 can include the metadata 319M corresponding to the instantiation of an information asset 319A and metadata 311M, 313M, 315M, and 317M, and lineage information 313L, 315L, 317L, and 319L of the related information assets 311A, 313A, 315A, and 317A. For example, the result may include information for visually representing the relationships between information assets 311A, 313A, 315A, and 317A.

Figure 4:
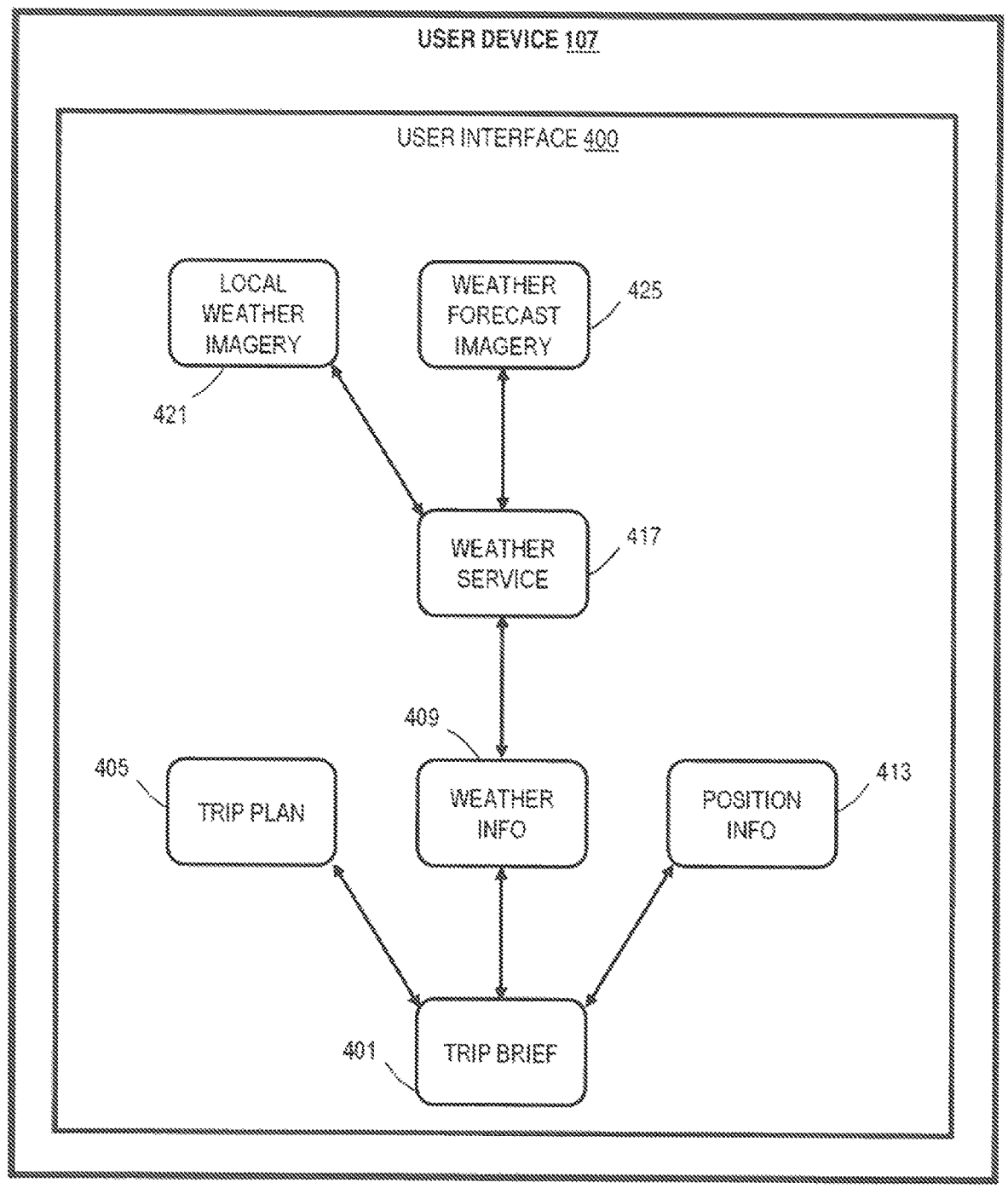
FIG. 4 shows an example of a user interlace in accordance for a query result, in accordance with aspects of the present disclosure.

FIG. 4 shows an example of a user interface 400 in accordance for a query result 150, in accordance with aspects of the present disclosure. The user interface 400 can be displayed to a user, for example, via a user device 107, which can be the same or similar to that previously described. The user interface 400 can be a visual representation of a lineage for a particular information asset, which is rendered by the user device 107 based on a query result (e.g., result 150) of an information asset registry (e.g., registry 111), as previously described herein. In the example illustrated in FIG. 4, trip brief 401 can be a derivative information asset for which the user device 107 provided a query of the registry. The trip brief 401 can be, for example, an itinerary for an aircraft flight derived from several other information assets, including: a trip plan 405 obtained from a trip planning service, weather information 409 obtained from another trip planning service, and position information 413 obtained from a navigation system. Additionally, the weather information 409 used in the flight plan can be device from a weather service 417. Further, the weather service 417 uses imagery, which may be an information asset derived from a local weather radar imagery 421 and weather forecast imagery 425.

As shown in the example illustrated in FIG. 4, the user interface provides a user of the user device 107 of the trip brief 401a visual representation of the lineage. Thus, the user can visualize the information assets 405 . . . 425 from which the trip brief was derived. Additionally, the user can inspect any of the upstream sources for data quality or distribution limitations based on the metadata retrieved from the registry. For example, via inspection of metadata stored by the registry corresponding the information assets 405 . . . 425 and/or via warnings automatically generated by the user device 107, the user can be alerted if any of the information assets 405 . . . 425 from which the trip brief 401 is derived are out-of-date, inaccurate, or of insufficient quality. For example, if the quality of the position information 413 is below a predetermined accuracy and/or the weather information is older than a predetermined period of time, then the user interface may generate an alert. Additionally, based on the metadata of information assets 401 . . . 425, such as illustrated in FIG. 5 below, the user can obtain other information, such as descriptions, classifications, types, creation times, revision times, usage limitations of the information assets 401 . . . 425.

FIG. 5 shows table illustrating an example of a data structure for information asset descriptor 500 (e.g., metadata) that may be stored in an information asset registry (e.g., registry 111) in accordance with aspects of the present disclosure. The information asset descriptor 500 can be the same or similar to those previously discussed herein (e.g., source information 115 or derivative information 123). As illustrated in FIG. 5, the information asset descriptor 500 can be a data structure that stores information (e.g., metadata 311M . . . 319M and lineal links 313L . . . 319L) as entries in logical elements 501A . . . 501V, which may be rows or columns of the data structure. The content of the information asset descriptor 500 can be established by a user (e.g., an originator) or other entity that registers the corresponding information asset with the registry. Additionally, in accordance with aspects of the present disclosure, such user or entity can modify the asset information to manage the use of information assets derived from the corresponding information asset. For example, the user or entity can modify the usage limitations 555 to prevent a derivative use of the information asset by a particular entity.

The information asset descriptor 500 can include an identifier 503 on corresponding information asset (e.g., information asset 311A . . . 319A), a name 505 of the information asset, a description 509 of the information asset, a source/location 513, a content class, 517, a content type 521, a creation date 525, a revision date 529, an expiration date 531, lineage information 533, usage limitations 555, accuracy information 559, timeliness information 561, and quality information 563. The identifier 503 can be a unique identifier (e.g., an alphanumeric code) of a corresponding information asset. The identifier 503 may be used to particularly identify an information asset in a query of the information registry. The name 505 and the description 509 can be human-readable terminology describing the corresponding information asset. The source/location 513 can be a pointer to a physical location of the corresponding information asset or a pointer to a resource (e.g., a lookup table) that provides the physical location of the corresponding information asset. The content class 517 (i.e., asset class type) that the system supports and allows people to integrate and reference in a singular system (e.g., data services, external web services, databases, information services, applications). The content type 521 can be a subset of the content class 517

The creation date 525 can be the calendar date and/or time at which the corresponding information asset was created or registered. The revision date 529 can be one or more dates and/or time at which the corresponding information asset was modified. The expiration date 531 can be a date at which the corresponding information asset is should no longer be considered accurate, timely, and/or valid. The lineage 533 can be information identifying one or more information assets in the family of the corresponding information asset. The lineage 533 can identify one or more parent information assets and one or more child derivative assets. In some implementations, any parent information assets are identified by a user or other entity at the time the corresponding information asset is registered. Additionally, in some implementations, such user or other entity can modify the lineage information to identify child information assets derived from the information asset. Further, in some embodiments, the information asset management can automatically scan the registry for related information assets by searching the text of data structures of asset information stored in the registry, determining that a probability of the relationship is greater than predetermined threshold, and updated the lineage information 533 to include any lineal links discovered by the comparison. The usage limitations 555, the accuracy information 559, the timeliness information 561, and be quality information 563 can be the same or similar to those previously described herein.

Figure 6:
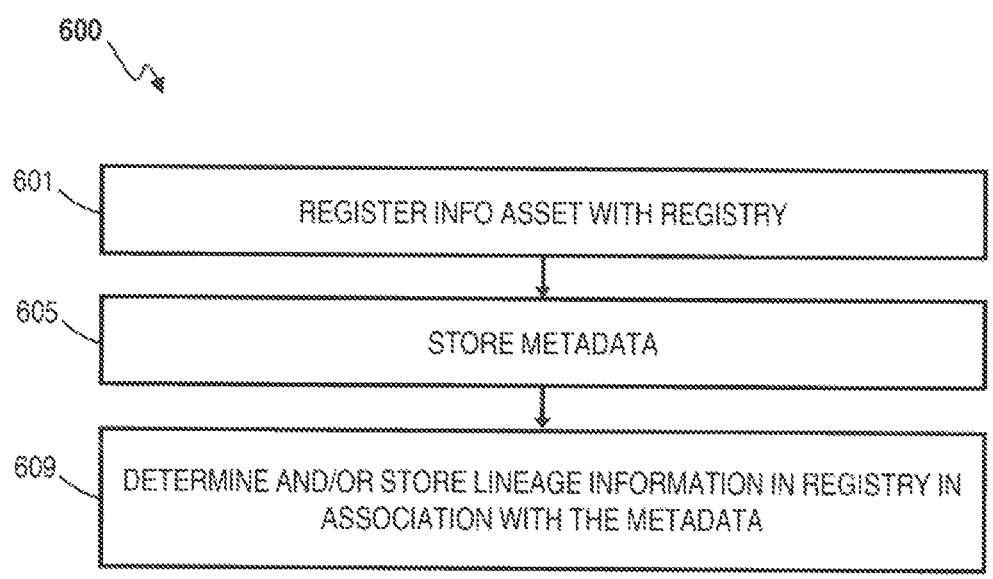
FIG. 6 shows a flow block diagram illustrating an example of a process, in accordance with aspects at the present disclosure.
Figure 7:
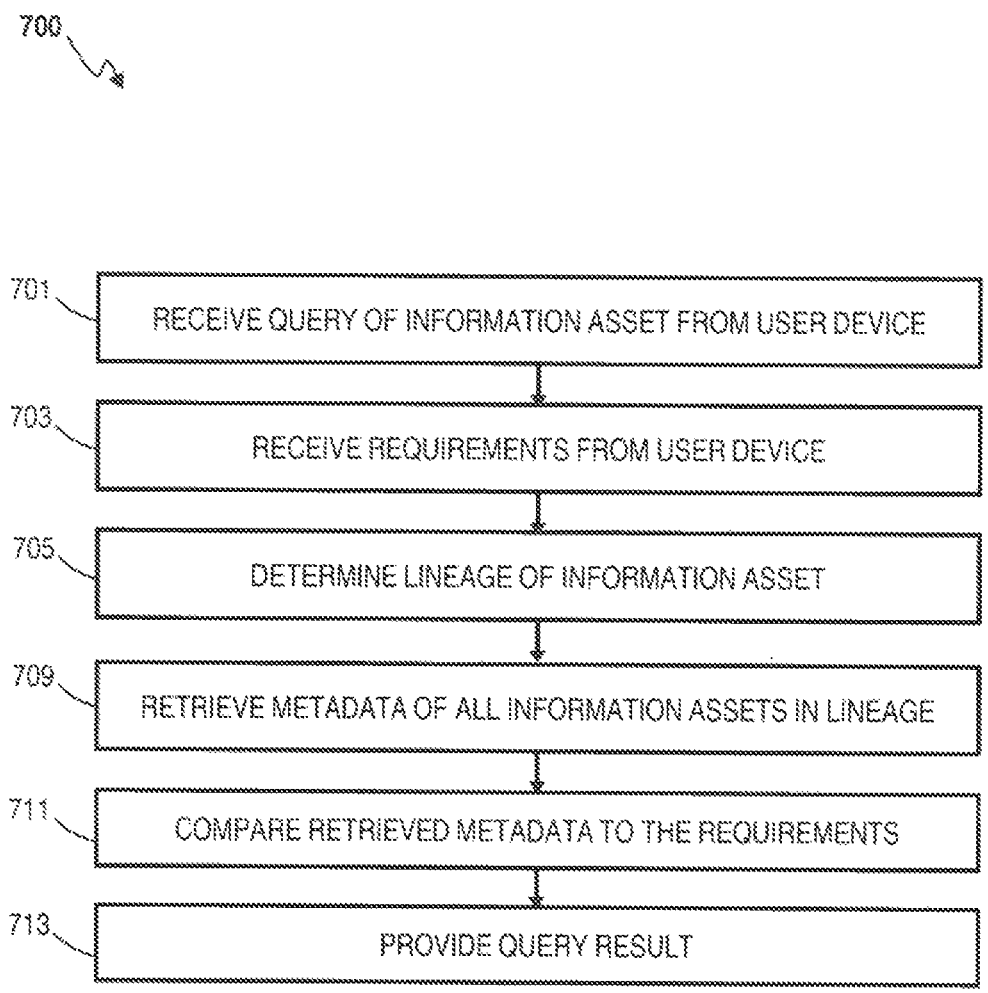
FIG. 7 shows a flow block diagram illustrating an example of a process, in accordance with aspects of the present disclosure.

The flow diagrams in FIGS. 6 and 7 illustrate examples of the functionality and operation of possible implementations of systems, methods, and computer program products according to various implementations consistent with the present disclosure. Each block in the flow diagrams of FIGS. 6 and 7 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 6 and 7. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 6 shows a flow block diagram illustrating an example of a registration process 600 in accordance with aspects of the present disclosure. At 601 an information asset management system (e.g., information asset management system 101 executing registration module 251) registers an information asset (e.g., source asset 119 or derivative asset 127) received from a user or other entity (e.g., source 103 or derivative source 105) with an information asset registry (e.g., information asset registry 111). Registering the information asset can include creating an asset information record (e.g., information asset descriptor 500) and assigning such asset information record an identifier that is unique within the registry.

At 605 the information asset management system stores metadata (e.g., source information 115 or derivative information 123) populating the record created at 601. Storing the metadata can include receiving information from the user or entity and/or the information asset. Storing the metadata can also include normalizing, and/converting the metadata and storing it in a standard format (e.g., using a predefined markup language schema), which can be the same or similar to that previously described above with regard to FIG. 5.

At 409 the information asset management system determines and/or stores lineage information for the information asset in the registry in association with the metadata stored at 605. In some situations, a user or entity provides the lineage information. In other situations, the information asset management system determines related information assets, as previously described herein.

FIG. 7 shows a flow block diagram illustrating an example of a process 700 for querying an information asset registry (e.g., registry 111) of an information asset management system (e.g., information asset management system 101) and processing a query result (e.g., result 150), in accordance with aspects of the present disclosure.

At 701, the information asset management system (e.g., executing query module 255) receives a query (e.g., query 140) from the user device (e.g., user device 107). The query can identity a particular information asset (e.g., information asset 319C). In some situations, a user of the user device may submit the query to obtain information about the information asset and any related information assets (such as described above with regard to FIG. 4). In other situations, the user device can automatically provide the query in response to an attempt to perform some operation on be information asset (e.g., retrieve, modify, duplicate, instantiate, execute).

At 703, the information asset management system can receive requirements (e.g., requirements 145) from the user device for the information asset queried at 701. The requirements can include defining usage, quality, and/or accuracy for the information asset, which may be the same or similar to that previously described herein. For example, the information asset can be spatiotemporal data (e.g., trip plan 405, position information 413, local weather imagery 42, and weather forecast imagery 425,), and the requirements can specify a minimum quality for such spatiotemporal data (resolution≤5 meters) used by the information asset, or they could specify creation time for the spatiotemporal data (e.g., within one hour of the present time). Also, for example, the requirements may include credentials indicating a particular individual and/or entity (e.g., user credentials) that is attempting to use the information asset queried at 701.

At 705, the information asset management system determines the lineage of the information asset queried at 701. For example, the information asset management system may retrieve metadata (e.g., metadata 319M) of the information asset queried at 701 (e.g., information asset 319A) from the registry. Based on linage information stored in or associated with the retrieved metadata, the information asset management system can identify metadata (e.g., metadata 317M) as senior information asset (e.g., information asset 317A). And, likewise, the information asset management system can iteratively identify metadata (e.g., metadata 313M and 311M) of more senior information assets (e.g., information assets 313A and 311A) until metadata of all senior information assets in the lineage of the information asset queried at 701 are determined.

At 709, the information asset management system (e.g., executing the result module 257) retrieves the metadata of the information assets determined in 709. Notably, some or all of the metadata can vary among the different information assets determined at 709. For example, a provider of a senior information asset (e.g., information asset 311A) may have change the resolution, accuracy, or usage rights such that it no longer meets the requirements of the information asset (e.g., information asset 319A), which was queried at 701.

At 711 the information asset management system (e.g., executing the result module 257) compares the metadata retrieved at 709 with the requirements received at 703. For example, as previously described herein, the information asset management system can determine whether any of the metadata (e.g., metadata 313M, 313M 317M, and 319M) includes information violating the requirements with regard to accuracy, quality, timeliness, or usage limitations.

At 713, the information asset management system provides a result (e.g., result 150) in response to the query received at 701. In implementations, the result includes the metadata retrieved at 709. For example, the result may be represented by using the lineal relationships, as illustrated in FIG. 4. Such graph can include indications of which information assets in the linage were determined at 711 to violate the requirements received at 703. Additionally, or alternatively, in some implementations, the result provided at 709 can be an authorization or denial for using (e.g., instantiating, executing, storing, copying, modifying, and/or transferring) the information asset queried in 701. Thus, the registry allows provides for increased accuracy and security of derivative information asset based on the current metadata of all of the information assets registry that are lineally linked by the registry.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood those within the art that, in general, terms used herein, and especially in the appended claims (e.g., bodies of the appended claims) are generally intended as "open" terms (e.g., the term "including" should be interpreted as "including hut not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A end C together, B and C together, and/or A, B, and together, etc, la those instances where a convention analogous to "at least one of A, B, C, etc.)" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled the art will recognize that the disclosure is also thereby described in terms of any individual member or subgroup of members of the Markush group.

The invention claimed is:

1. An information asset management system configured to enhance security and accuracy of information assets, the information asset management system comprising:
   a processor;
   a computer-readable memory device operatively coupled to the processor and storing program instructions;
   a computer-readable data storage device operatively coupled to the processor and including an information asset registry storing metadata of a plurality of information assets and having a logical structure that lineally links two or more of the plurality of information assets, the logical structure comprising:
      a plurality of data structures including:
         a logical element comprising an identifier identifying an information asset of the plurality of information assets;
         one or more logical elements including metadata of the information asset; and
         one or more logical elements including lineage information that relates the information asset to one or more of the plurality of information assets,
   wherein the program instructions, when executed by the processor, cause the information asset management to perform operations comprising:
      receiving a query for information describing a first information asset of the plurality of information assets;
      determining, based on receiving the query, a lineage represented by one or more lineal links in the information asset registry between the first information asset and at least one other information asset of the plurality of information assets;
      retrieving the metadata of the first information asset and the at least other information asset in the lineage; and
      providing a result based on the metadata of the first information asset and the at least other information asset, wherein the providing the result includes identifying timeliness information of the first information asset, the timeliness information identifying a freshness of the first information asset.

2. The information asset management system of claim 1, wherein the one or more lineal links associate the first information asset and at least one other information asset of the plurality of information assets, the operations further comprising providing an alert based on the timeliness information indicating a freshness that does not satisfy a threshold.

3. The information asset management system of claim 1, wherein providing the result comprises combining metadata of the first information asset with the metadata of the one or more information assets.

4. The information asset management system of claim 3, wherein the operations further comprise limiting use of the first information asset based on the result.

5. The information asset management system of claim 4, wherein limiting comprises determining that the use of the first information asset violates a predefined usage limitation included in the first information asset and the at least one other information asset of the plurality of information assets.

6. The information asset management system of claim 4, wherein limiting comprises determining that the use of the information asset violates a predefined limitation on transferring the first information asset based on the predefined limitation included in the first information asset and the at least one other information asset of the plurality of information assets.

7. The information asset management system of claim 4, wherein limiting comprises determining that accuracy information included in the first information asset and the at least one other information asset of the plurality of information assets is below a predetermined requirement of the first information asset.

8. The information asset management system of claim 4, wherein limiting comprises determining that the timeliness information, accuracy information, and quality information included in the first information asset and the at least one other information asset of the plurality of information assets is below a predetermined requirement of the first information asset.

9. The information asset management system of claim 4, wherein the limiting is based on determining that the timeliness information included in the first information asset and the at least one other information asset of the plurality of information assets is below a predetermined threshold of the first information asset.

10. The information asset management system of claim 1, wherein the operations further comprise:
    receiving one or more requirements from a user device; and
    comparing the one or more requirements to the metadata of the first information asset and the at least other information asset.

11. A system for enhancing security and accuracy of information assets, the system comprising:
    a processor;
    a computer-readable memory device operatively coupled to the processor and storing program instructions; and
    a computer-readable data storage device operatively coupled to the processor and including an information asset registry lineally linking a plurality of information assets in a logical data structure,
    wherein the program instructions, when executed by the processor, cause the system to perform operations comprising:
       receiving a query for a first information asset of the plurality of information assets;

determining, based on receiving the query, a lineage represented by a lineal link between the first information asset and a second information asset of the plurality of information assets using the information asset registry;

determining, based on the lineal link, an attribute of the first information asset and an attribute of the second information asset in the lineage;

providing a result to the query based on the attribute of on the first information asset and the attribute of the second information asset, the result limiting use of the first information asset, wherein the providing the result includes identifying timeliness information of the first information asset, the timeliness information identifying a freshness of the first information asset.

12. The system of claim 11, wherein the lineal link represents a direct lineal relationship between the first information asset and the second information asset.

13. The system of claim 11, wherein providing the result comprises combining the attribute of the first information asset with the attribute of the second information asset.

14. The system of claim 13, wherein limiting the use of the first information asset comprises restricting execution, transfer, and duplication of the first information asset.

15. The system of claim 11, wherein limiting the use of the first information asset comprises determining that the use of the first information asset violates a predefined usage limitation included in the attribute of the first information asset or a predefined usage limitations included in the attribute of the second information asset.

16. The system of claim 11, wherein limiting the use of the first information asset comprises determining that the use of the information asset violates a predefined limitation on transferring the first information asset based on the attribute of the first information asset and on the attribute of the second information asset.

17. The system of claim 11, wherein the attribute of the first information asset and the attribute of the second information asset comprise accuracy information.

18. The system of claim 11, wherein the attribute of the first information asset and the attribute of the second information asset comprise quality information.

19. The system of claim 11, wherein the attribute of the first information asset and the attribute of the second information asset comprise the timeliness information.

20. The system of claim 11, wherein the operations further comprise:

receiving one or more requirements from a user device; and comparing the one or more requirements to the attribute of the first information asset and the attribute of the second information asset.

* * * * *